(12) United States Patent
Brunstein

(10) Patent No.: US 6,711,517 B2
(45) Date of Patent: Mar. 23, 2004

(54) HYBRID INERTIAL NAVIGATION METHOD AND DEVICE

(75) Inventor: Etienne Brunstein, Eragny (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 10/178,907

(22) Filed: Jun. 25, 2002

(65) Prior Publication Data

US 2003/0028340 A1 Feb. 6, 2003

(30) Foreign Application Priority Data

Jun. 26, 2001 (FR) ............................................. 01 08407

(51) Int. Cl.$^7$ ............................................. G06F 19/00
(52) U.S. Cl. .......................................... 702/94; 702/94
(58) Field of Search .................. 702/94, 160; 342/357, 342/25; 364/450, 449; 600/595; 701/1; 11/457

(56) References Cited

U.S. PATENT DOCUMENTS

| 4,318,300 A | 3/1982 | Maughmer |
| 2002/0097181 A1 * | 7/2002 | Chou et al. ............ 342/357.06 |
| 2002/0143491 A1 * | 10/2002 | Scherzinger ............... 702/160 |

FOREIGN PATENT DOCUMENTS

| DE | 187 24 894 A1 | 11/1998 | |
| JP | 09-243385 | * 9/1997 | ............ G01C/21/00 |

* cited by examiner

Primary Examiner—John Barlow
Assistant Examiner—Tung S Lau
(74) Attorney, Agent, or Firm—Larson & Taylor, PLC

(57) ABSTRACT

A first strapdown navigation unit (2) generating a first state vector ($X_{2u}$) whose components give position, attitude and speed values of a carrier with a small instantaneous error. The method includes actions consisting of:

- generating by means of a second navigation unit (1), a second state vector ($X_{1u}$) whose components give position, attitude and speed values of the said carrier with a small long-term error;
- combining the first and second state vector to obtain an error observation vector ($\delta Y$);
- generating an error estimate vector ($^\wedge\delta X_{2u}$) from the error observation vector ($\delta Y$), by means of a filter (5);
- combining the error estimate vector ($^\wedge\delta X_{2u}$) thus obtained with the first state vector ($X_{2u}$) so as to obtain an estimated vector ($^\wedge X_{2u}$) of the carrier position, attitude and speed values with a small instantaneous error and a small long-term error.

7 Claims, 6 Drawing Sheets

HYBRID INERTIAL NAVIGATION METHOD AND DEVICE

BACKGROUND OF THE INVENTION

Different types of carriers are known such as aircraft, ships or land vehicles whose navigation requires knowledge of position, speed and attitude (heading, roll and pitch).

A modern inertial navigation system generally includes inertial sensors such as gyrometers and accelerometers, which are integrally fastened onto the carrier (called a "strapdown" system).

The gyrometers measure angular rotation and enable an analytical platform to be slaved to remain fixed in a geographical reference frame. The accelerometers measure accelerations which are projected into this analytical platform and then integrated once to supply the speed, then a second time to supply the position. Attitude is obtained by extracting 3 angles of passage from the carrier reference frame to the reference frame of the analytical platform.

The accuracy of an inertial navigation system directly depends on the errors of the inertial sensors (gyrometers and accelerometers), and more specifically on the projection of these errors in the local geographical reference frame.

For a strapdown navigation system, the projection of these errors basically depends on the trajectory of the carrier; it cannot therefore be controlled.

The accuracy of a strapdown navigation system is therefore limited by the intrinsic accuracy of these sensors. In the case of long-duration inertial navigation, the errors of position depend chiefly on the accuracy of the gyrometers.

For autonomous navigation over long periods, for several tens or even several hundreds of hours, without external means of position updating, performance basically depends on the stability of the gyrometers.

Developing special inertial components increases the cost of the inertial system without ever completely protecting the results from drift.

In order to improve the accuracy of long-duration navigation of a strapdown inertial system, we may consider using a strapdown inertial core mounted on a mechanical device enabling this core to be placed in different successive positions in order to average out the gyrometer errors projected in the local geographical reference frame.

The attitude information output from the strapdown inertial system enables the mechanical device to be directly controlled so as to place the core successively in different positions substantially fixed with respect to the local geographical reference frame.

A long-duration navigation method by means of an inertial core including a linked reference frame with axes Xm, Ym, Zm, mounted on a carrier for measuring its movements with respect to a geographical reference frame of fixed directions along three axes Xg, Yg, Zg, then comprises:

measuring actions consisting of continuously measuring the orientation of the linked reference frame in the geographical reference frame, by means of the inertial core;

positioning actions consisting of applying a sequence of 180° turning cycles of the inertial core which each maintain the Ym axis in a direction parallel to the Yg axis, a succession of two 180° turns around the Xm axis being preceded and followed by one 180° turn around the Zm axis, a succession of two 180° turns around the Zm axis being preceded and followed by one 180° turn around the Xm axis.

The positioning actions are used to compensate for measurement errors by reversing the sign along the Ym axis at each 180° turn, by reversing the sign along the Xm axis at each 180° turn around the Zm axis and by reversing the sign along the Zm axis at each 180° turn around the Xm axis.

The measuring actions carried out continuously then enable the errors to be mutually compensated on each of the Xm, Ym, Zm axes of the linked reference frame, so as to reduce the projections of errors on the Xg, Yg, Zg axes by averaging their interventions on a cycle.

Such an inertial system gives satisfactory results over a sufficiently long interval of time by averaging the defects of the inertial components. However, instantaneous measurements remain error-prone.

Although the long-term performances of such a system with a gimbals-mounted inertial core are significantly better than with a core that is fixed with respect to the carrier, as far as short-term performances are concerned, the accuracy of this system on roll, pitch and heading is limited by the accuracies of coding of the gimbals angles and of the associated processing sequence, by the deformation of the gimbals and the accuracy of their production, by the stability of a possible internal suspension of the unit supporting the inertial sensors within the inertial core. Furthermore, the rotations of the inertial core project the errors of the components in a variable way and introduce a high-frequency noise. This high-frequency noise interferes with the roll, pitch, heading and speed measurements.

SUMMARY OF THE INVENTION

In order to remedy the aforementioned drawbacks, the object of the invention is a long-duration navigation method by means of a first strapdown navigation unit generating a first state vector whose components give position, attitude and speed values of a carrier with a small instantaneous error, characterized in that it includes actions consisting of:

generating by means of a second navigation unit, a second state vector whose components give position, attitude and speed values of the said carrier with a small long-term error;

combining the first and second state vector to obtain an error observation vector;

generating an error estimate vector from the error observation vector, by means of a statistical filter;

combining the error estimate vector thus obtained with the first state vector so as to obtain an estimated vector of the carrier position, attitude and speed values with a small instantaneous error and a small long-term error.

The object of the invention is also a navigation device for obtaining an estimated vector of position, attitude and or speed values of a carrier with a small instantaneous error and a small long-term error, characterized in that it includes:

a first strapdown navigation unit set up to generate a first state vector whose components give position, attitude and speed values of a carrier with a small instantaneous error;

a second navigation unit set up to generate a second state vector whose components give position, attitude and speed values of the said carrier with a small long-term error;

a statistical filter set up for combining at the input the first and second state vector so as to generate at the output of the said filter an error estimate vector for obtaining an estimated vector of the carrier position, attitude and speed values with a small instantaneous error and with a small long-term error.

BRIEF DESCRIPTION OF THE DRAWINGS

A number of details and advantages of the invention will be better understood with the aid of the example of embodiment whose description follows, referring to the attached drawings where identical references indicate the same elements and in which.

DESCRIPTION OF PREFERRED EMBODIMENTS

Figure 1:
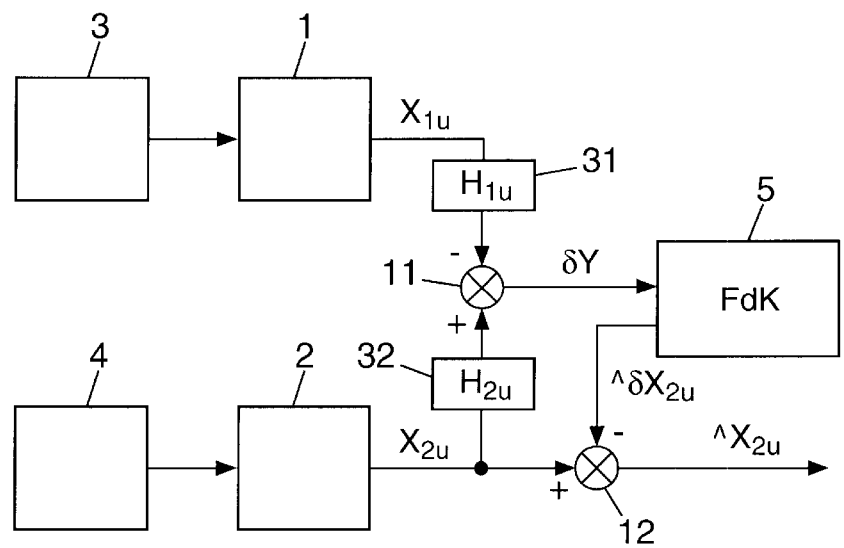
FIG. 1 shows a device in accordance with the invention.

Referring to FIG. 1, a navigation unit 1 generates a state vector $X_{1u}$ from measurements supplied by the sensors of an inertial core 3. The navigation unit 1 described later, is designed to minimize long-term measurement errors. The components of the vector $X_{1u}$ describe calculated position, speed and attitude states. Three position components are latitude, longitude and altitude to which three speed components correspond. Three attitude components are heading, roll and pitch.

A navigation unit 2 generates a state vector $X_{2u}$ from measurements supplied by the sensors of an inertial core 4. The navigation unit 2 is of a known strapdown type. The inertial core 4 being fixed rigidly to the carrier, it is known that the instantaneous errors on the values given by this type of navigation system are small. However, the accumulation of these errors, even small ones over time, is unsatisfactory in the long term. The components of the state vector $X_{2u}$ describe three position states, three speed states and three attitude states comparable to those of the state vector $X_{1u}$.

As we shall see later, navigation unit 1 enables long-term measurement errors to be minimized by averaging. However, the instantaneous measurement errors are greater than those of navigation unit 2 owing to the composition of navigation unit 1.

An error observation vector $\delta Y$ is obtained by combining calculated state vectors $X_{2u}$ and $X_{1u}$. For example, a first observation matrix $H_{1u}$ enables certain components of the state vector $X_{1u}$ to be retained and a second observation matrix $H_{2u}$ enables as many comparable components of the state vector $X_{2u}$ to be retained. The components retained at the output of the observation matrix $H_{1u}$ are subtracted from the comparable components at the output of the observation matrix $H_{2u}$ by means of a subtractor 11. The components of the error observation vector $\delta Y$ therefore describe the same number of calculated measurement differences between the states of the state vector $X_{1u}$ and the states of the state vector $X_{2u}$. A Kalman filter 5, receiving the error observation vector $\delta Y$ at the input, generates an estimated error vector $\hat{\delta X}$ at the output. The vector $\hat{\delta X}$ furnishes the best estimate of the errors committed on the state vector $X_{2u}$ as a function of the differences between the state vectors $X_{2u}$ and $X_{1u}$.

By deducting the error estimate vector $\hat{\delta X}$ from the state vector $X_{2u}$ by means of a subtractor 12, we obtain an estimated vector $\hat{X}_{2u}$ whose coordinates describe the aforementioned states without the measurement errors of navigation unit 2.

Figure 2:
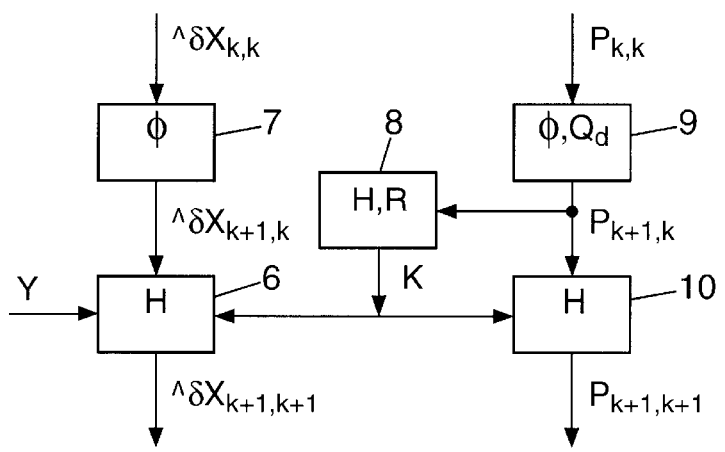
FIG. 2 is a possible scheme for a non-linear statistical filter.

The Kalman filter 5 is now described in more detail with reference to FIG. 2. The Kalman filter calculates a value $\hat{\delta X}_{k+1,k+1}$ of the vector $\hat{\delta X}$ at each instant $t_{k+1}=(k+1)\Delta t$ where $\Delta t$ represents an interval of time between two successive samplings of the error observation vector $\delta Y$. The value $\hat{\delta X}_{k+1,k+1}$ is calculated as a function of a previous error estimate vector $\hat{\delta X}_{k,k}$ obtained at instant $t_k=k\Delta t$ and of the error observation vector $\delta Y$ sampled between instants $t_k$ and $t_{k+1}$.

A calculation block 6 has an observation matrix H associated in a known way with a state matrix F that models the inertial system in the form of a differential equation.

$$d\delta X/dt = F.\delta X + U \quad (1)$$

where $\delta X$ is the error state vector of the system and U a white noise vector whose power spectral density Q is known.

The calculation block 6 receives as input the error observation vector $\delta Y$, an estimated error vector $\hat{\delta X}_{k+1,k}$ generated by a calculation block 7 and a Kalman gain K generated by a calculation block 8. The calculation block 6 obtains the vector $\hat{\delta X}_{k+1,k+1}$ by applying the following formula to its inputs:

$$\hat{\delta X}_{k+1,k+1} = \hat{\delta X}_{k+1,k} + K(\delta Y - H.\hat{\delta X}_{k+1,k}) \quad (2)$$

The calculation block 7 uses a transition matrix $\Phi$ associated in a known way with the matrix F. The calculation block 7 receives as input an estimated error vector $\hat{\delta X}_{k,k}$ generated by the calculation block 6 at a previous instant $t_k$, so as to obtain the vector $\hat{\delta X}_{k+1,k}$ by applying the following formula:

$$\hat{\delta X}_{k+1,k} = \Phi.\hat{\delta X}_{k,k} \quad (3)$$

The calculation block 8 uses the observation matrix H and a measurement noise covariance matrix R. The calculation block 8 receives a covariance matrix as input over the time interval $\Delta t$, with the notation $P_{k+1,k}$ which is generated by a calculation block 9. P represents the covariance matrix of the residual estimation error ($\delta X - \hat{\delta X}$). The calculation block 8 obtains the Kalman gain by applying the following formula at its inputs:

$$K = P_{k+1,k}H^t \cdot (H.P_{k+1,k} \cdot H^t + R)^{-1} \quad (4)$$

where $H^t$ designates the transpose of the matrix H and the exponent $-1$ the inverse of the matrix obtained in brackets.

The calculation block 9 uses the transition matrix $\Phi$ and a covariance matrix of the state noise in discrete form $Q_d$. The calculation block 9 receives as input a covariance matrix $P_{k,k}$ generated by a calculation block 10 at the previous instant $t_k$. The calculation block 9 obtains the covariance matrix $P_{k+1,k}$ by applying the following formula:

$$P_{k+1,k} = \Phi \cdot P_{k,k}\Phi^t + Q_d \quad (5)$$

where $\Phi^t$ denotes the transpose of the matrix $\Phi$

The calculation block 10 uses the observation matrix H and receives as input the covariance matrix $P_{k+1,k}$ and the gain K. The calculation block 10 generates a covariance matrix $P_{k+1,k+1}$, which will be used by the software block 9 after instant $t_{k+1}$, by applying the following formula:

$$P_{k+1,k+1} = (I - K.H) \cdot P_{k+1,k} \quad (6)$$

where I designates the unit matrix.

Thus the Kalman filter 5 generates an estimation vector $\hat{X}_{k+1,k+1}$ at instant $t_{k+1}$ from an estimation vector $\hat{\delta X}_{k,k}$ at the previous instant $t_k$, the observation vector $\delta Y$ and a covariance matrix $P_{k+1,k}$ between instants $t_k$ and $t_{k+1}$. The Kalman filter is statistical since its gain K depends firstly on the covariance matrix of the estimation error $P_{k+1,k}$ between instants $t_k$ and $t_{k+1}$ and secondly on the covariance matrix of the measurement noise R.

At instant $t_k=0$, the error estimate vector $\hat{\delta X}_{0,0}$ and the covariance matrix $P_{0,0}$ are for example initialized at zero values for the estimate vector and at high values for the diagonal of the covariance matrix P.

At each instant $t_{k,k>0}$, the components of the error estimate vector $\hat{\delta}X_k$ give estimated error values on the components of the state vector $X_{2u}$ based on the difference observed between the values given by each of the navigation units 1, 2 and the known statistic Q of the navigation system.

By deducting the estimated error values on the components of the state vector given by navigation unit 2, a measurement estimate vector $\hat{X}_{2u}$ is obtained, which has the advantage of short-term accuracy of navigation unit 2 and the advantage of long-term accuracy of navigation unit 1.

Figure 3:
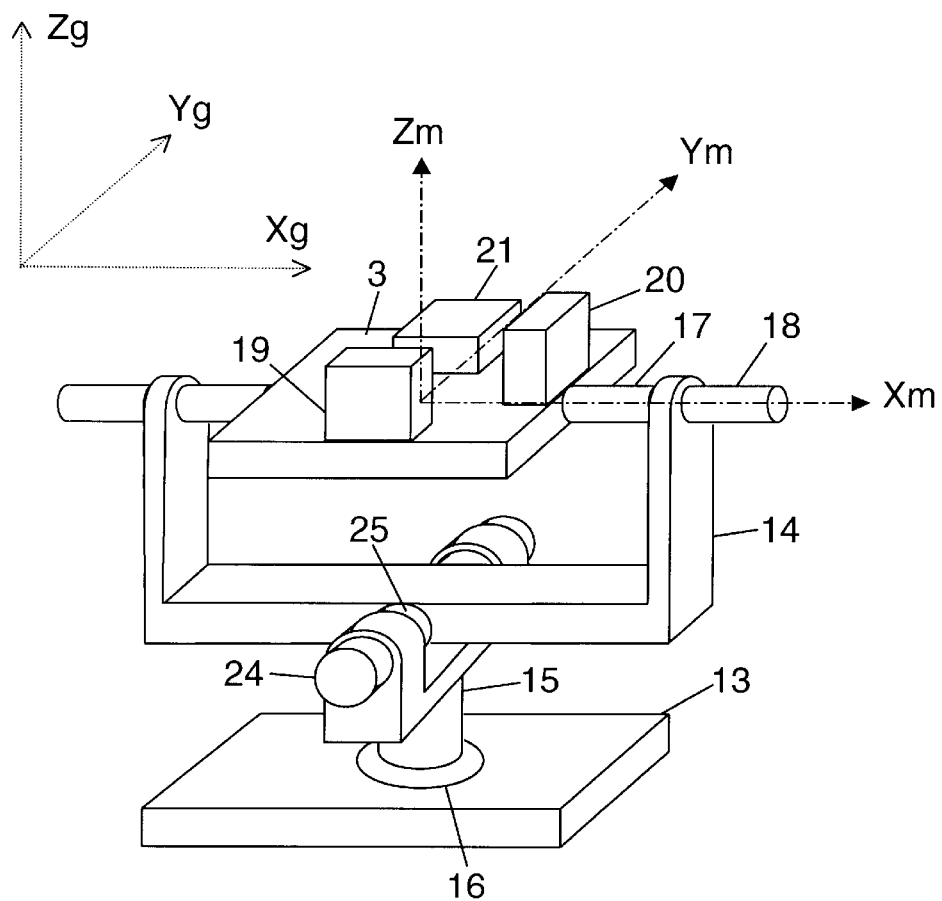
FIG. 3 shows a mounted-mounted inertial core in the initial position.

Referring to FIG. 3, a platform 13 is integral with a carrier such as a ship for example. The platform 13 supports a mounted joint 14 for maintaining three axes Xm, Ym, Zm of a reference frame linked to the inertial core 3, in substantially parallel directions with respect to three axes Xg, Yg, Zg of a fixed geographical reference frame. The axes Xg and Yg are pointing respectively northwards and westwards in the horizontal plane, the axis Zg is pointing upwards along the vertical.

A first degree of freedom in rotation is provided by a physical shaft 15, integral with the carrier. A motor 16 enables the shaft 15 to be rotated so as to cancel out the effects of variations in the heading of the carrier.

A second degree of freedom in rotation is provided by a physical shaft 17, integral with the inertial core 3. A motor 18 enables the shaft 17 to be rotated so as to cancel out the effects of rotation of the carrier around the shaft 17. Thus, a combination of rotations of physical shafts 15 and 17, enables the axis Ym to be kept constantly in a direction substantially parallel to the axis Yg.

A third degree of freedom in rotation is provided by a third physical shaft 18, perpendicular to the physical shaft 15 and the physical shaft 17. A motor 24 enables the third shaft 25 to be rotated so as to cancel out the rotations of the carrier around the shaft 25. Thus, a combination of rotations of physical shafts 15 and 25, enables the axis Xm to be kept constantly in a direction substantially parallel to the axis Xg.

When the axes Xm and Ym are kept in a direction parallel to the axes Xg and Yg respectively, the axis Zm is kept in a direction parallel to the axis Zg.

The inertial core 3 includes three sensors 19, 20, 21, which each fulfils the functions of a gyrometer and an accelerometer. Sensor 19 measures the accelerations of the inertial core 3 in the direction of the Ym axis and the rotations of the inertial core 3 around the Ym axis. Sensor 20 measures the accelerations of the inertial core 3 in the direction of the Xm axis and the rotations of the inertial core 3 around the Xm axis. Sensor 21 measures the accelerations of the inertial core 3 in the direction of the Zm axis and the rotations of the inertial core 3 around the Zm axis.

The gyrometer functions of sensors 19, 20, 21 are used to measure rotation angles of the inertial core 3 with respect to each of the three axes Xg, Yg, Zg. It is then possible to calculate rotation angles of the carrier by deduction from the measured rotation angles.

The accelerometer functions of each of the sensors 19, 20, 21 are used to measure the acceleration of the inertial core in each of the directions along the axes Xm, Ym, Zm. It is then possible to calculate accelerations of the carrier along the axes Xg, Yg, Zg of the geographical reference frame, by deduction from the measured accelerations then the speed by integration and the position of the carrier in the geographical reference frame Xg, Yg, Zg by double integration.

Each of the angle measurements made by sensors 19, 20, 21 is affected by drift, scale factor and axis alignment errors.

Drift error is the expression of a measurement offset, a zero magnitude is not strictly measured at zero. This offset is generally constant over the whole measurement range. The value of the drift error has the notation Dx on the Xm axis, Dy on the Ym axis and Dz on the Zm axis respectively.

The scale factor error is the error on the multiplying factor of the measurement. The value of the scale factor error has the notation Fx on the Xm axis, Fy on the Ym axis and Fz on the Zm axis respectively.

Alignment errors result from the fact that the three axes Xm, Ym, Zm are not perfectly orthogonal. The orthogonality error between the axes Xm and Ym has the notation Cxy, the orthogonality error between the axes Ym and Zm has the notation Cyz and the orthogonality error between the axes Zm and Xm has the notation Czx.

To reduce the effect of these errors upon navigation accuracy, the inertial core 3 is periodically turned through 180° so as to change the sign of the error. Thus, by averaging the projections of the different measurement errors in the local geographical reference frame Xg, Yg, Zg, an accumulation of positive error is reduced by an accumulation of negative error over an identical integration period for measurements of opposite signs.

The 180° turning of the sensors is achieved by rotation of the physical shafts 15 and 17. The rotation values enabling the errors to be averaged with a minimum of basic positions are $+\pi$ or $-\pi$ rotations around the different axes.

Starting from an initial position as shown in FIG. 3, a first possible rotation is that given by the pair $[\gamma(0), \beta(0)]$, that is to say, that corresponding to a zero rotation. The orientation of the sensors and therefore the orientation of the errors, are kept as they are.

Figure 4:
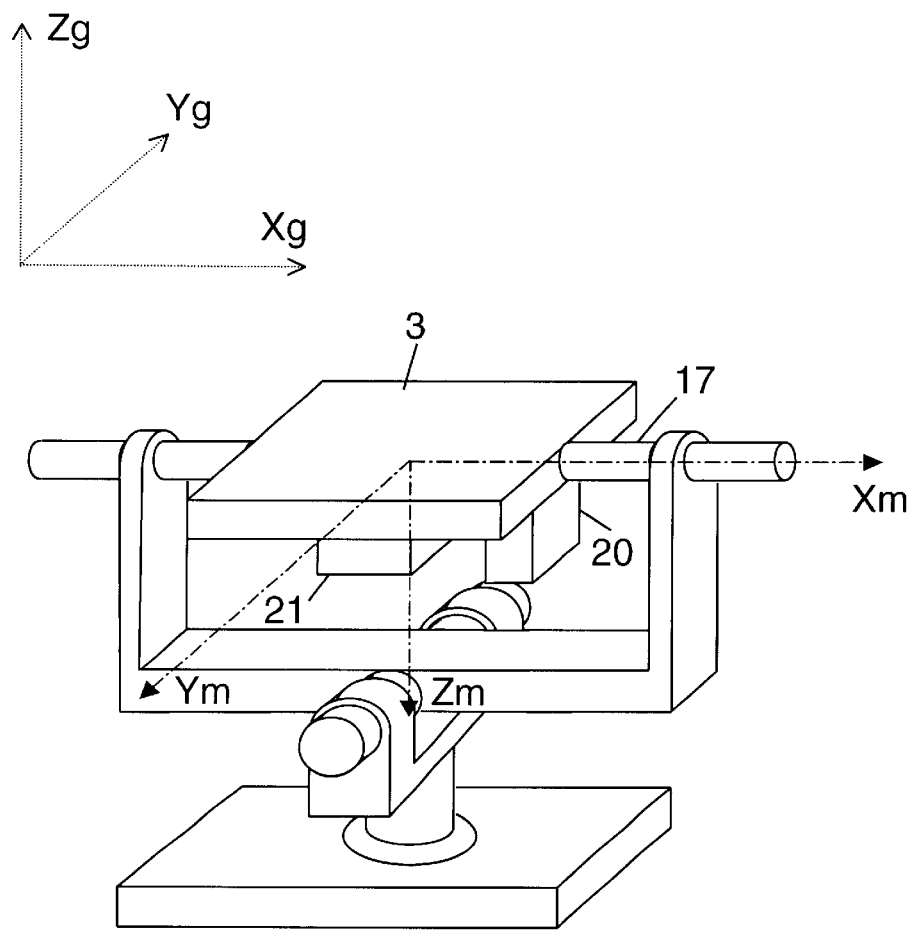
FIGS. 4 and 5 show the inertial core of FIG. 3 after turning through 180°.

A possible second and third rotation are those given by the pairs $[\gamma(0), \beta(+\pi)]$ and $[\gamma(0), \beta(-\pi)]$. The final result, identical for each of these rotations, is shown in FIG. 4. Only the direction of rotation of the angle $\beta$ changes, having a different influence in transient state for changing from an initial position to the final position.

Referring to FIG. 4, the inertial core 3 is turned through a rotation of 180°, i.e. $\pi$ radians, of the shaft 17 so that the sensors are now located on the underside of the inertial core 3. Sensor 20 remains aligned for taking measurements along the Xm axis, without change of sign of the errors relative to the Xg axis. Sensor 21 remains aligned for taking measurements along the Zm axis, without change of sign of the errors relative to the Zg axis. Sensor 19 is no longer visible as it is hidden by the volume of the inertial core 3. It is obvious that sensor 19 remains aligned for taking measurements along the Ym axis, without change of sign of the errors relative to the Yg axis. An error that is added, or respectively subtracted, on the measurement of sensors 19 and 21 as they are configured in FIG. 3, is subtracted, or respectively added, on the measurement of sensors 19 and 21 as they are configured in FIG. 4. An error that is added, or respectively subtracted, on the measurement of sensor 20 as it is configured in FIG. 3, continues to be added, or respectively subtracted, on the measurement of sensor 20 as it is configured in FIG. 4.

Figure 5:
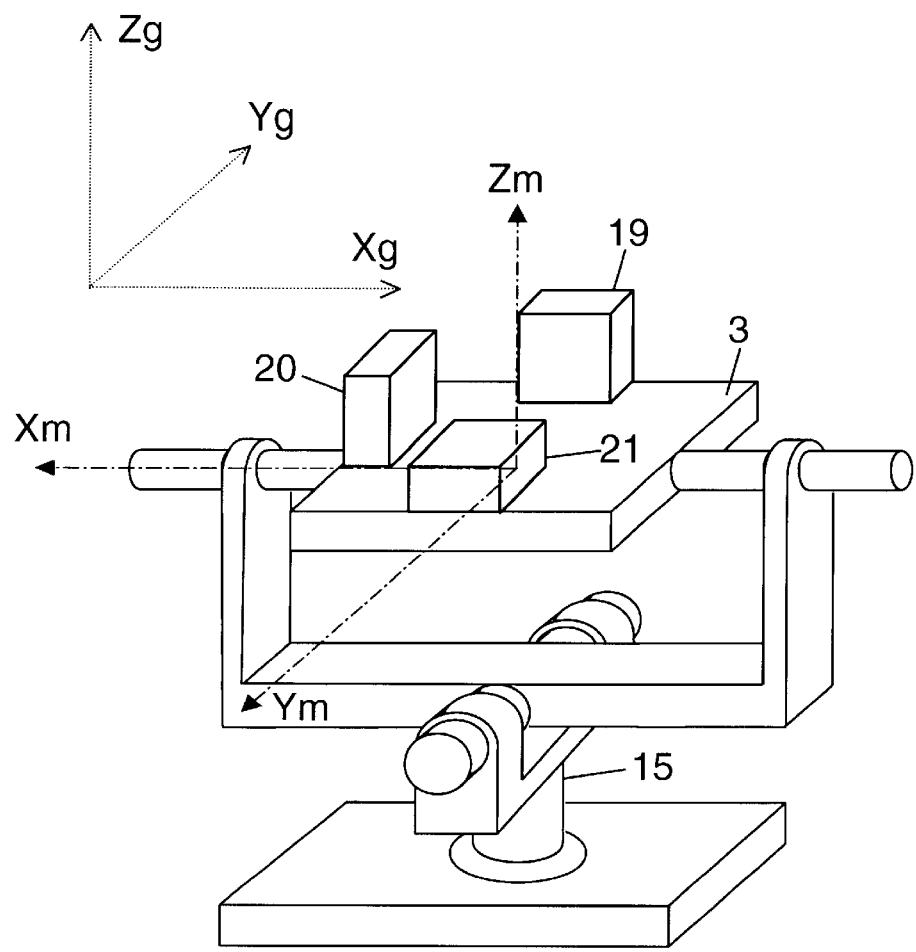

A possible fourth and fifth rotation are those given by the pairs $[\gamma(+\pi), \beta(0)]$ and $[\gamma(-\pi), \beta(0)]$. The final result, identical for each of these rotations, is shown in FIG. 5, starting from FIG. 3 as the initial position. It is obvious that the result would be different if we started from another initial position, such as that in FIG. 4.

Referring to FIG. 5, the inertial core 3 is turned by a 180° rotation of the shaft 15 so that the sensors rest on the upper face of the inertial core 3. Sensor 20 remains aligned for taking measurements along the Xm axis, with a change of sign of the error projections on the Xg axis. Sensor 21 remains aligned for taking measurements along the Zm axis, without a change of sign of the error projections on the Zg axis. Sensor 19 remains aligned for taking measurements along the Ym axis, with a change of sign of the error projections on the Yg axis. An error that is added, or respectively subtracted, on the measurement of sensors 19 and 20 in their initial configuration, is subtracted, or respectively added, on the measurement of sensors 19 and 20 in their final configuration. An error that is added, or respectively subtracted, on the measurement of sensor 21 in its initial configuration, continues to be added, or respectively subtracted, on the measurement of sensor 21 in its final configuration.

In the method according to the invention, a succession of rotations chosen from the five previously referred to, is applied cyclically to the inertial core 3, according to programmed sequences of rotation of the physical shafts 15 and 17 by means of motors 16 and 18. Four rotations are sufficient for reversing the sign of the projections of each error on the axes of the local geographical reference frame Xg, Yg, Zg. Two rotations around the Xm axis reverse and reset the initial position of the error projections relative to the Yg and Zg axes. Two rotations around the Zm axis reverse and reset the initial position of the error projections relative to the Zg and Xg axes. However, the rotations themselves lead to errors, mainly under the effect of scale factor and axis alignment errors. In order to average out the errors caused by the 180° turns themselves, each cycle is composed of a series of eight rotations which, at the end of the cycle, replace the inertial core 3 in the initial position at the start of the cycle. Each choice of rotation in the series is possible from the five rotations mentioned previously. There are therefore $5^8$, that is, 390,625 series of potential rotations for a cycle.

From all the potential series, nine basic series have been selected or simultaneously reducing the effects of drift, scale factors and alignments. On one cycle, the period $\Delta t$ of a rotation for passing from an initial position to a final position is identical for each rotation of the series. Typically, the period $\Delta t$ is a few seconds. At the end of each rotation, the inertial core 3 is maintained at its final position for an interval of time equal to an eighth of time cycle Tc at close to $\Delta t$, before undergoing the next rotation of the series for which the initial position is the final position of the previous rotation. Typically, a time cycle is several minutes. Following one cycle, a new cycle of rotations is performed with the same series as for the previous cycle or with another series chosen on the basis of the nine series proposed.

The nine basic series are shown in table 1, the first row of which indicates the eight rotations Rot1 to Rot8 of a cycle. The second row gives the positions of the inertial core at the start and end of each rotation with respect to the local geographical reference frame Xg, Yg, Zg. Xn indicates that the Xm axis is pointing northwards. Xs indicates that the Xm axis is pointing southwards. Yw indicates that the Ym axis is pointing to the west. Ye indicates that the Ym axis is pointing to the east. Zh indicates that the Zm axis is pointing upwards. Zb indicates that the Zm axis is pointing downwards. The subsequent rows list the series S1 to S9 where $\gamma(+\pi)$ indicates a rotation of $+\pi$ radians around the Zm axis, $\gamma(-\pi)$ indicates a rotation of $-\pi$ radians around the Zm axis. Similarly, $\beta(+\pi)$ indicates a rotation of $+\pi$ radians around the Xm axis, $\beta(-\pi)$ indicates a rotation of $-\pi$ radians around the Xm axis.

TABLE 1

|      | Rot1 | Rot2 | Rot3 | Rot4 | Rot5 | Rot6 | Rot7 | Rot8 |
|------|------|------|------|------|------|------|------|------|
| Pos. | P1   | P2   | P3   | P4   | P3   | P2   | P1   | P4   | P1 |
|      | Xn   | Xs   | Xs   | Xn   | Xs   | Xs   | Xn   | Xn   | Xn |
|      | Yw   | Ye   | Yw   | Ye   | Yw   | Ye   | Yw   | Ye   | Yw |
|      | Zh   | Zh   | Zb   | Zb   | Zb   | Zh   | Zh   | Zb   | Zh |
| S1   | $\gamma(+\pi)$ | $\beta(+\pi)$ | $\gamma(+\pi)$ | $\gamma(-\pi)$ | $\beta(+\pi)$ | $\gamma(-\pi)$ | $\beta(+\pi)$ | $\beta(+\pi)$ |
| S2   | $\gamma(+\pi)$ | $\beta(+\pi)$ | $\gamma(+\pi)$ | $\gamma(-\pi)$ | $\beta(-\pi)$ | $\gamma(-\pi)$ | $\beta(+\pi)$ | $\beta(-\pi)$ |
| S3   | $\gamma(+\pi)$ | $\beta(+\pi)$ | $\gamma(+\pi)$ | $\gamma(-\pi)$ | $\beta(-\pi)$ | $\gamma(-\pi)$ | $\beta(-\pi)$ | $\beta(+\pi)$ |
| S4   | $\gamma(+\pi)$ | $\beta(+\pi)$ | $\gamma(-\pi)$ | $\gamma(+\pi)$ | $\beta(+\pi)$ | $\gamma(-\pi)$ | $\beta(+\pi)$ | $\beta(+\pi)$ |

TABLE 1-continued

|      | Rot1 | Rot2 | Rot3 | Rot4 | Rot5 | Rot6 | Rot7 | Rot8 |
|------|------|------|------|------|------|------|------|------|
| S5   | $\gamma(+\pi)$ | $\beta(+\pi)$ | $\gamma(-\pi)$ | $\gamma(+\pi)$ | $\beta(-\pi)$ | $\gamma(-\pi)$ | $\beta(+\pi)$ | $\beta(-\pi)$ |
| S6   | $\gamma(+\pi)$ | $\beta(+\pi)$ | $\gamma(-\pi)$ | $\gamma(+\pi)$ | $\beta(-\pi)$ | $\gamma(-\pi)$ | $\beta(-\pi)$ | $\beta(+\pi)$ |
| S7   | $\gamma(+\pi)$ | $\beta(+\pi)$ | $\gamma(-\pi)$ | $\gamma(-\pi)$ | $\beta(+\pi)$ | $\gamma(+\pi)$ | $\beta(+\pi)$ | $\beta(+\pi)$ |
| S8   | $\gamma(+\pi)$ | $\beta(+\pi)$ | $\gamma(-\pi)$ | $\gamma(-\pi)$ | $\beta(-\pi)$ | $\gamma(+\pi)$ | $\beta(+\pi)$ | $\beta(-\pi)$ |
| S9   | $\gamma(+\pi)$ | $\beta(+\pi)$ | $\gamma(-\pi)$ | $\gamma(-\pi)$ | $\beta(-\pi)$ | $\gamma(+\pi)$ | $\beta(-\pi)$ | $\beta(+\pi)$ |

What this series has in common is that all the rotations involve a 180° turn, i.e. a rotation of $\pi$ radians (180°). We find a 180° turn in a plane perpendicular to the Zm axis followed by a 180° turn in a plane perpendicular to the Xm axis, followed by two 180° turns in the plane perpendicular to the Zm axis, followed by a 180° turn in the plane perpendicular to the Xm axis, followed by a 180° turn in the plane perpendicular to the Zm axis, followed by two 180° turns in the plane perpendicular to the Xm axis.

Considering a succession of two 180° turns Rot7, Rot8 around the Xm axis, this is preceded by a 180° turn Rot6 and followed by a 180° turn Rot1 of the next cycle, around the Zm axis. Considering a succession of two 180° turns Rot3, Rot4 around the Zm axis, this is preceded by a 180° turn Rot2 and followed by a 180° turn Rot5 around the Xm axis.

Thus, the projections of errors along the Zg axis are of the first sign on the first time interval that precedes the first 180° turn, of the opposite sign over three time intervals preceding the fifth 180° turn, of the first sign again over two time intervals preceding the seventh 180° turn, of the opposite sign over the time interval preceding the eighth 180° turn and of the first sign again over the time interval that succeeds the eighth 180° turn. The error projections along the Zg axis are of the first sign over four time intervals and of the opposite sign over four time intervals. The average of the error projections along the Zg axis tend to be cancelled out over a cycle.

The error projections along the Xg axis initially of the first sign before the first 180° turn, are of the opposite sign over two time intervals preceding the third 180° turn, of the first sign again over the time interval preceding the fourth 180° turn, of the opposite sign over two time intervals preceding the sixth 180° turn, of the first sign again over two time intervals preceding the eighth 180° turn and of the first sign again over a time interval that succeeds the eighth 180° turn. The error projections along the Xg axis are of the first sign over four time intervals and of the opposite sign over four time intervals. The average of the error projections along the Xg axis tend to be cancelled out over a cycle.

The error projections along the Yg axis change sign at each 180° turn. The errors along the Yg axis, alternately of the first sign and of the opposite sign, therefore tend to cancel out over a cycle.

Programmed sequences are executed by a processor, preferably a high-speed processor, which controls the motors 16 and 18 in a known way for performing the 180° turns.

While error projections are globally compensated over the intervals of a cycle, in which the inertial core is kept in a stable position between two rotations, error projections are not a priori compensated during the rotations. Over each period $\Delta t$, a rotation leads to residual errors of angle measurement, due basically to errors of scale factor and gyrometer axis alignment. The construction and assembly tolerances of the gyrometers are used to estimate the values of errors of drift Dx, Dy, Dz, scale factors Fx, Fy, Fz and axis alignment Cyz, Czx, Cxy. It is then possible to calculate the residual errors by integrating error calculation formulae known to the person skilled in the art, over each period $\Delta t$ of a rotation. By adding up each type of residual error projection over all the periods Δt of the rotations of a cycle and dividing the result obtained by the total duration of a cycle, we obtain an average of each type of error projection over a cycle. By applying a succession of cycles such as those previously described, the calculated residual error terms that appear on the different axes, are given by table 2 which follows:

TABLE 2

|  | Drift | Scale factors | Axis alignment |
|---|---|---|---|
| Average of the projected errors on Xg | $kdx \cdot \frac{\Delta t}{T\text{ cycle}} \cdot D_x$ | $kfx \cdot \Omega \cdot Fx$ | $kcx \cdot \frac{\Delta t}{T\text{ cycle}} \cdot \Omega \cdot Cx$ |
| Average of the projected errors on Yg | $kdy \cdot \frac{\Delta t}{T\text{ cycle}} \cdot D_y$ | 0 | $kcy \cdot \frac{\Delta t}{T\text{ cycle}} \cdot \Omega \cdot Cy$ |
| Average of the projected errors on Zg | $kdz \cdot \frac{\Delta t}{T\text{ cycle}} \cdot D_z$ | $kfz \cdot \Omega \cdot Fz$ | $kcz \cdot \frac{\Delta t}{T\text{ cycle}} \cdot \Omega \cdot Cz$ |

For each 180° turn series, the coefficients kdx, kdy, kdz are constants independent of drift errors Dx, Dy, Dz, the coefficients kfx, kfz are constants independent of scale factor errors Fx, Fy, Fz, the coefficients kcx, kcy, kcz are constants independent of alignment errors Cyz, Czx, Cxy. The coefficients Cx, Cy, Cz are linear combinations of the alignment errors Cyz, Czx, Cxy.

By choosing a short duration Δt of a 180° turn compared with a time cycle Tc, it is possible to obtain a very small $$\frac{\Delta t}{Tc}$$

ratio. Observing that the terms Dx, Dy, Dz concerning drift are multiplied by this ratio, we note that the residual error due to drift is small. Similarly, observing that the terms Cx, Cy, Cz concerning alignments are multiplied by this ratio and by the speed of the Earth's rotation Ω, we note that the residual error due to alignments is small. It is noted that the error due to scale factors Fx, Fz, is not degraded under the effect of the 180° turns of the inertial core 3. Observing that the scale factors Fx, Fz are multiplied by the speed of the Earth's rotation Ω, we note that the residual error due to scale factors is smaller than in a configuration where the inertial core 3 is rigidly secured onto the carrier (strapdown), without the gimbals' joints. This is because the speed of the Earth's rotation is small compared with the movements of the carrier, in particular course heading movements. Moreover, no error is proportional to the speed of the 180° turns which can thus be increased to reduce the ratio $$\frac{\Delta t}{Tc}.$$

These striking properties apply to constant values on a 180° turn cycle. In the first place, these properties are maintained for slowly variable magnitudes with respect to the duration of the cycle.

Thanks to the previously described mechanization and the 180° turn cycles, the influence of the different error terms is significantly reduced. Accordingly, the long-term stability of gyrometers is no longer a dimensioning criterion for these applications.

The teaching of the invention is not limited to gyrometers, it is also applicable to accelerometers. The basic errors of accelerometers (bias, scale factors and axis alignments) are also averaged by projection in the local geographical reference frame.

The previously described method, used for placing the inertial core 3 in a succession of observable fixed positions with respect to the local geographical three-axis system G determined by the axes Xg, Yg, Zg, can be used to extend to long-duration applications, gyrometers and/or accelerometers normally used within systems rigidly secured to the carrier (strapdown systems), over shorter periods.

The invention is not restricted to the previously described example of embodiment. The same results are obtained by reversing the direction of all the rotations of angle γ and/or by reversing the direction of all the rotations of angle β, i.e. by replacing γ(+π) with γ(−π) in the series and vice versa and/or β(+π) with β(−π) and vice versa. Similarly, the properties obtained remain unaltered by circular permutation of the order of 180° turns, the nine basic solutions are identical if they are set out as a whole starting from one of the second to eighth 180° turns ending at the preceding 180° turn as stated in the description.

Figure 6:
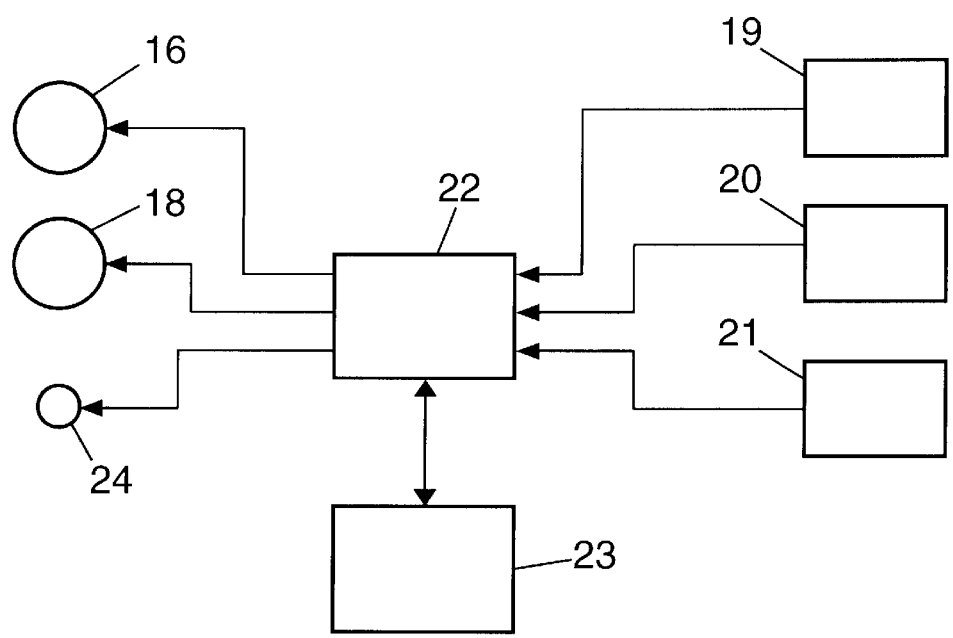
FIG. 6 is a control diagram of the device in accordance with the invention.

Referring to FIG. 6, a processor 22 receives the measurements from sensors 19, 20, 21 and using these measurements calculates three attitude angles by executing a first strapdown inertial navigation program. A first attitude angle is the angle α whose axes Zm, Xm diverge from axes Zg, Xg in the same plane. A second attitude angle is the angle β whose axes Ym, Zm diverge from axes Yg, Zg in the same plane. A third attitude angle is the angle γ whose axes Xm, Ym diverge from axes Xg, Yg in the same plane.

The processor 22 controls at least the motors 16 and 18 by executing a second program contained in a memory 23. The program takes into account the attitude angles calculated by the first program in order to slave the inertial core 3 onto each stable position.

The program uses the previously described basic series to perform the 180° turns according to the cycles conforming to the invention method.

By rotating the motors 16 and 18 by an angle of 180° through a cycle according to the invention method, the program causes the error projections to act on the three axes Xg, Yg and Zg alternately in one direction and in the opposite direction so as to cancel out these error projections on average over a cycle.

When the processor 22 controls only the motors 16 and 18, it can be accepted that low amplitude alternating rotations around the Ym axis compensate for the errors in both directions on average over each time interval of a stable position and on average over a cycle.

The device is further improved when the processor 22 controls the motor 24 by executing the program then specially provided for this purpose in order to maintain the inertial core 3 in each stable position along the Yg axis and in addition also along the Xg and Zg axes.

The teaching of the invention is not restricted to the example of embodiment described in reference to FIG. 1. For example, the state vectors $\hat{X}_{1u}$ and $\hat{X}_{2u}$ can be combined differently.

Figure 7:
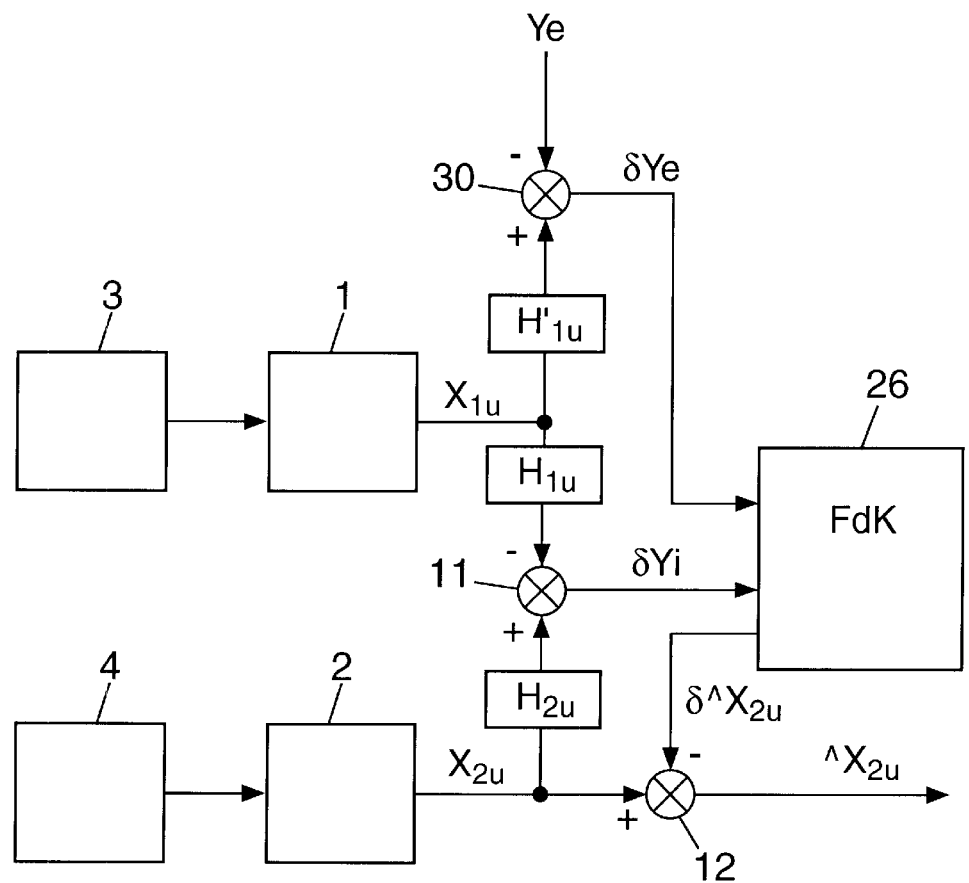
FIG. 7 shows another device in accordance with the invention.

Referring to FIG. 7, the subtractor 11 can be used to obtain an error observation vector δYi in the same way as the vector δY is obtained in FIG. 1. A distinction is made here between the vector δYi of error observation between the state vectors of inertial units 1 and 2, and a vector δYe of error observation between the state vector of the inertial unit 1 and an external observation vector Ye. As in the case of a conventional navigation device with a single inertial unit, the position components of the external observation vector Ye result from measurements made by sensors or peripheral systems such as for example a GPS geographical positioning system, a barometric sensor providing an altitude reference or a pressure sensor providing an underwater reference. The speed components result from measurements performed by an odometer or a Doppler effect system, or result from a knowledge of zero speed when the carrier is immobile. The external observation vector Ye can be used to make adjustments in position or speed at certain specified instants. An observation matrix $H'_{1u}$, enables certain components of the state vector $X_{1u}$ to be retained. A subtractor 30 is used to deduct the external observation vector Ye from the output of the observation matrix $H'_1 u$ to obtain the external error observation vector δYe. A Kalman filter 26 receives the observation vectors δYe and δYi as input for generating the error estimate vector $δ\hat{X}_{2u}$ used as referred to in FIG. 1. Kalman filter 26, similar to Kalman filter 5, encompasses in its state vector $δ\hat{X}$ the inertia models of both units 1, 2 and the external reference model relative to the observation vector Ye.

The first teaching of the invention is not limited to the particular use of a statistical filter such as the Kalman filter, for obtaining the error estimate vector. A filter can be envisaged with gains K precalculated or obtained with other methods such as that of least squares.

What is claimed is:

1. Long-duration navigation method by means of a first strapdown navigation unit generating a first state vector whose components give position, attitude and speed values of a carrier with a small instantaneous error, comprising the steps of:

generating by means of a second navigation unit, a second state vector whose components give position, attitude and speed values of the said carrier with a small long-term error;

combining the first and second state vectors by subtracting the second vector from the first vector to obtain an error observation vector;

generating an error estimate vector from the error observation vector, by means of a filter; and combining the error estimate vector thus obtained with the first state vector by subtracting the error estimate vector from the first state vector so as to obtain an estimated vector of the carrier position, attitude and speed values with a small instantaneous error and a small long-term error.

2. Method of long-duration navigation according to claim 1, wherein the filter is a Kalman filter.

3. Method of long-duration navigation according to claim 1, wherein the second state vector is generated by means of a second strapdown navigation unit whose inertial core is periodically turned through 180° so as to average measurement errors in opposing directions.

4. Navigation device for obtaining an estimated vector of position, attitude and or speed values of a carrier with a small instantaneous error and a small long-term error, comprising:

a first strapdown navigation unit set up to generate a first state vector whose components give position, attitude and speed values of a carrier with a small instantaneous error;

a second navigation unit set up to generate a second state vector whose components give position, attitude and speed values of the said carrier with a small long-term error;

a first means for combining the first and second state vectors by subtracting the second vector from the first vector;

a filter set up for receiving at the input the output of the first means so as to generate at the output of the said filter an error estimate vector; and a second means for combining the error estimate vector and the first state vector by subtracting the error estimate vector from the first state vector for obtaining an estimated vector of the carrier position, attitude and speed values with a small instantaneous error and with a small long-term error.

5. Navigation device according to claim 4, wherein the filter is a Kalman filter.

6. Navigation device according to claim 4, wherein the second navigation unit is a strapdown navigation unit whose inertial core is periodically turned through 180° so as to average measurement errors in opposing directions.

7. Navigation device according to claim 4, comprising the first means for obtaining a first error observation vector equal to the difference of the first and second state vectors and a third means for obtaining a second error observation vector equal to the difference of the second state vector and an external observation vector, and wherein the filter is set up to combine the error observation vectors for obtaining the error estimate vector.

* * * * *